United States Patent [19]

Hein et al.

[11] Patent Number: 5,127,190

[45] Date of Patent: Jul. 7, 1992

[54] SLIDING DOOR

[75] Inventors: Christian Hein, Langenhagen; Ulrich Theile, Hagen, both of Fed. Rep. of Germany

[73] Assignee: Dorma GmbH + Co. KG, Ennepetal, Fed. Rep. of Germany

[21] Appl. No.: 679,035

[22] PCT Filed: Oct. 18, 1990

[86] PCT No.: PCT/DE90/00793

§ 371 Date: May 10, 1991

§ 102(e) Date: May 10, 1991

[87] PCT Pub. No.: WO91/09197

PCT Pub. Date: Jun. 27, 1991

[30] Foreign Application Priority Data

Dec. 9, 1989 [DE] Fed. Rep. of Germany ....... 3940762

[51] Int. Cl.⁵ .............................................. E05F 15/20
[52] U.S. Cl. ........................................ 49/31; 49/28; 49/118; 49/141; 49/360
[58] Field of Search ............... 49/31, 379, 26, 28, 49/29, 118, 123, 141, 360, 25

[56] References Cited

U.S. PATENT DOCUMENTS

| 4,375,019 | 2/1983 | Yoshida | 49/31 X |
| 4,697,383 | 10/1987 | Hagiwara | 49/31 X |
| 4,738,052 | 4/1988 | Yoshida | 49/31 |
| 4,937,556 | 6/1990 | Scott et al. | 49/31 X |
| 5,012,455 | 4/1991 | Schwarz et al. | 49/31 X |

FOREIGN PATENT DOCUMENTS

| 495813 | 9/1977 | Australia . |
| 570637 | 3/1988 | Australia . |
| 601628 | 7/1978 | Switzerland | 49/118 |
| 2203262 | 10/1988 | United Kingdom . |

Primary Examiner—Philip C. Kannan
Attorney, Agent, or Firm—Max Fogiel

[57] ABSTRACT

A sliding door with two for example panels coupled with a belt-drive mechanism driven in turn by a motor. The panels are also connected to an auxiliary drive mechanism that is provided with energy by the panel as it slides into a closed position and that can move the panel when the clutch is deprived of current. At least one programming switch, a motion sensor, and a limit switch activate regular controls that move the panel automatically. Self-monitoring additional electronic controls constitute a door-safety module.

The object is to monitor the opening of the door in response to a signal from the motion sensor and to allow self-testing of the function of the auxiliary drive mechanism and ensure inherent reliability of the door-opening monitoring process. A door-safety module is controlled in accordance with a program and has at least one motion sensor and one limit switch associated with it.

14 Claims, 4 Drawing Sheets

SLIDING DOOR

BACKGROUND OF THE INVENTION

The invention concerns a sliding door with at least one panel coupled to a drive mechanism powered by a braked motor by way of an electromagnetic clutch, whereby the panel or panels is or are also connected to an auxiliary drive mechanism activated by its or their closing. As long as no current flows through the electromagnetic clutch, the panels can be opened with the auxiliary drive mechanism, and additional self-monitoring electronic controls that constitute a safety module accompany the regular controls, which are activated by an automatic switch.

A sliding door with two panels is described in German Patent Application P 3 915 241. It includes mechanisms for activating an electromagnetic clutch, for automatically monitoring whether the panels are opening safely, and for self-diagnosing the controls and components. The object of the present invention is to ensure that such doors, especially when they are installed in public buildings, will operate reliably and will in particular open in an emergency or when the door-activating system fails. Furthermore, the door is to be monitored to ensure that it is opening in response to an opening pulse emitted by a motion sensor, and the controls must ensure a self-activated operational test on the part of the auxiliary drive mechanism. In addition, both the monitoring of the door to ensure that it is opening in response to an opening pulse emitted by the motion sensor and the controls' ensurance of a self-activated operational test on the part of the auxiliary drive mechanism must be inherently reliable. An alarm must be emitted when the door encounters an obstacle and, once the obstacle has been removed, a operational test must be executed automatically. In the event of a power failure and when the doorway is employed as a route of escape or rescue, opening by means of the auxiliary drive mechanism must be ensured, and here again the door must automatically undergo self-testing once power is restored.

SUMMARY OF THE INVENTION

This object is attained in accordance with the invention by a door-safety module with various programs and instructions. Associated with the door-safety module for this purpose are at least one motion sensor and at least one limit switch. The door-safety module is interposed in a practical way between an opening-motion sensor, the programming switch, and a limit switch on the one hand and the regular controls, the electromagnetic clutch, and signaling devices on the other.

The door-safety module has in a practical way a coupling stage that is connected to the opening-motion sensor and to a START processor, directly and by way of two logic channels, each equipped with a timer. Both the programming switch and the limit switch are electrically connected to the START processor by way of the logic channels and to the electromagnetic clutch and signaling devices by way of a multistage FAIL-SAVE comparator and downstream relays. The logic channels and FAIL-SAVE comparator are connected to a generator that times the whole system.

Such a door-safety module makes it possible to monitor the opening of the sliding door in an escape-and-rescue doorway for example in response to an OPEN signal from the opening-motion sensor in that the signal starts a timer. The START processor then forwards the signal to the door's regular controls. At least one opening panel of a two-panel door must have passed its associated limit switch before the timer's prescribed time has elapsed. If the prescribed time elapses before the panel passes the limit switch, the electromagnetic clutch will disengage and the auxiliary drive mechanism will be activated, forcing the panel into its open position.

The programming will now signal the auxiliary drive mechanism to attempt to open the door. If the door does open, the panel will remain in its open position and can only be closed by activating it again.

If it is impossible to open the door automatically, the program will reengage the drive mechanism, which will attempt to open the door again within the prescribed time. If the attempt is unsuccessful, an audible and/or visible error signal will be forwarded to a central monitoring station for example. The door, however, will simultaneously attempt to open on its own. These sequences are constantly repeated. The approach now being described is employed with an escape and rescue doorway. The sequence can, however, be reversed for use with a regular door to keep it reliably closed.

The program can also monitor the main drive mechanism in addition to the auxiliary drive mechanism. The total control procedure occurs in the door-safety module, which ensures that the door will be as safe as possible for the people who use it.

Tests to ascertain that the auxiliary drive mechanism is working are carried out automatically at prescribed intervals, which can be entered in the timer. The interval between two tests depends on what means of storing power is employed, which must be recharged during that time for example. It is accordingly necessary to activate the programming switch in order to engage the sliding door, and, when the panel is in the closed position, the electromagnetic clutch will be disengaged and the timer will begin its brief count. In this case the auxiliary drive mechanism will be considered to be malfunctioning when the door panel does not pass beyond its associated limit switch before the brief count has been completed. When the auxiliary drive mechanism malfunctions, a constant opening signal will be released to the regular controls, supplying current to the electromagnetic clutch. If the panel passes the limit switch, the clutch will be deprived of current once the timer has completed its brief count. If, however, the limit switch is not passed by the time entered in the timer, the auxiliary drive mechanism will be activated again. These procedures alternate until the door opens, in which case the limit switch must be passed.

To ensure the intrinsic safety of the system monitoring the opening of the door subsequent to the opening signal from the motion sensor and to ensure automatic testing of the auxiliary drive mechanism's function, the overall circuitry of the door-safety module and its intake stages (programming switch, limit switch, and motion sensor) are all individually inherently reliable. This means that any errors that occur either in the incoming lines or in the circuit itself will always deprive the electromagnetic clutch of current and retract the door panel by way of the auxiliary drive mechanism. The logic events that participate in monitoring the opening process and the automatic testing of the auxiliary drive mechanism are individually ensured by a double-channel design with each logic channel monitoring the other.

To correct the switching signals from the programming switch and the limit switch, the door-safety module is provided with input filters, one downstream of the programming switch and upstream of the logic channels and the other between the limit switch and the logic channels and the FAIL-SAVE comparator.

The door-safety module has a power supply to provide current to its switching components. The power supply generates a high enough voltage to ensure normal safety operations on the part of the door. In addition to the power supply, the module has a means of storing power—an accumulator or capacitor for example—plus a means of charging it.

One of the main ideas of the invention is to provide an escape-route sliding door wherein every malfunction that occurs in the system and its operating components will be announced, and the door brought into a secure state, so that it can always be used without impediment. Furthermore, the malfunction must be eliminated before the door can be closed again. The malfunction can be announced audibly or visibly to a central point.

BRIEF DESCRIPTION OF THE DRAWINGS

The invention will now be specified with reference to a schematically illustrated embodiment.

DESCRIPTION OF THE PREFERRED EMBODIMENTS

Figure 1:
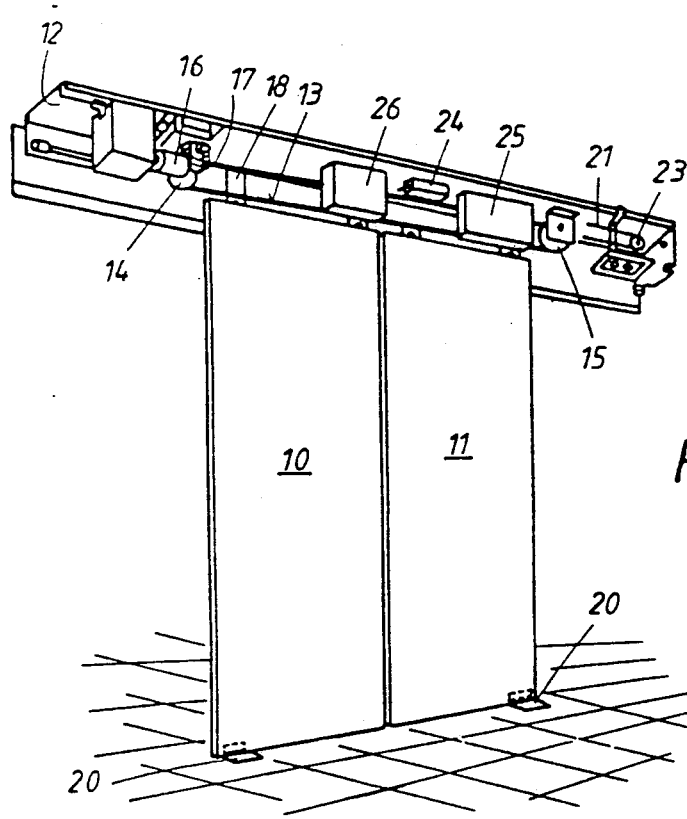
FIG. 1 is a perspective view of an embodiment with regular controls and a door-safety module.

The panels 10 and 11 of a two-paneled for example sliding door are in a known way mounted on rollers on a track that is part of a springer 12. The carrier that the rollers are mounted in also has backing rollers to prevent the panels from coming loose.

The illustrated embodiment of panels 10 and 11 is activated by a drive mechanism 13, which can for example be a continuous toothed belt with one end traveling around a cogwheel 14 and the other around a pulley 15 secured to springer 12. Cogwheel 14 is connected to a motor 16 with a transmission by way of an electromagnetic clutch 17 in such a way as to transmit torque. Panel 10 is secured to one strand of belt drive 13 in a known way, by brackets 18 for example, and panel 11 to the other strand by brackets 19, ensuring that the panels will slide in opposite directions when the belt drive 13 is activated. Panels 10 and 11 are secured to the floor in a known way with known floor slides 20.

Figure 2:
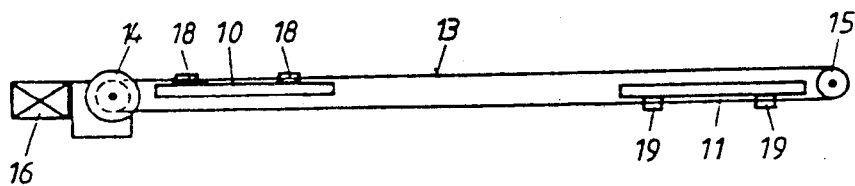
FIG. 2 is a schematic representation of the motorized mechanism that drives the door panel.
Figure 3:
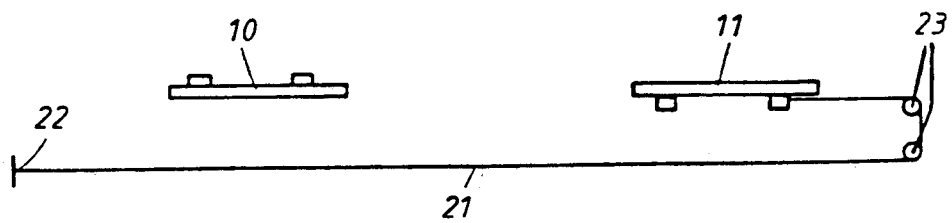
FIG. 3 is a schematic representation of the auxiliary drive mechanism associated with the door panel, which is operated by that mechanism and connected to the other panel by the motorized drive stage illustrated in FIG. 2.
Figure 4:
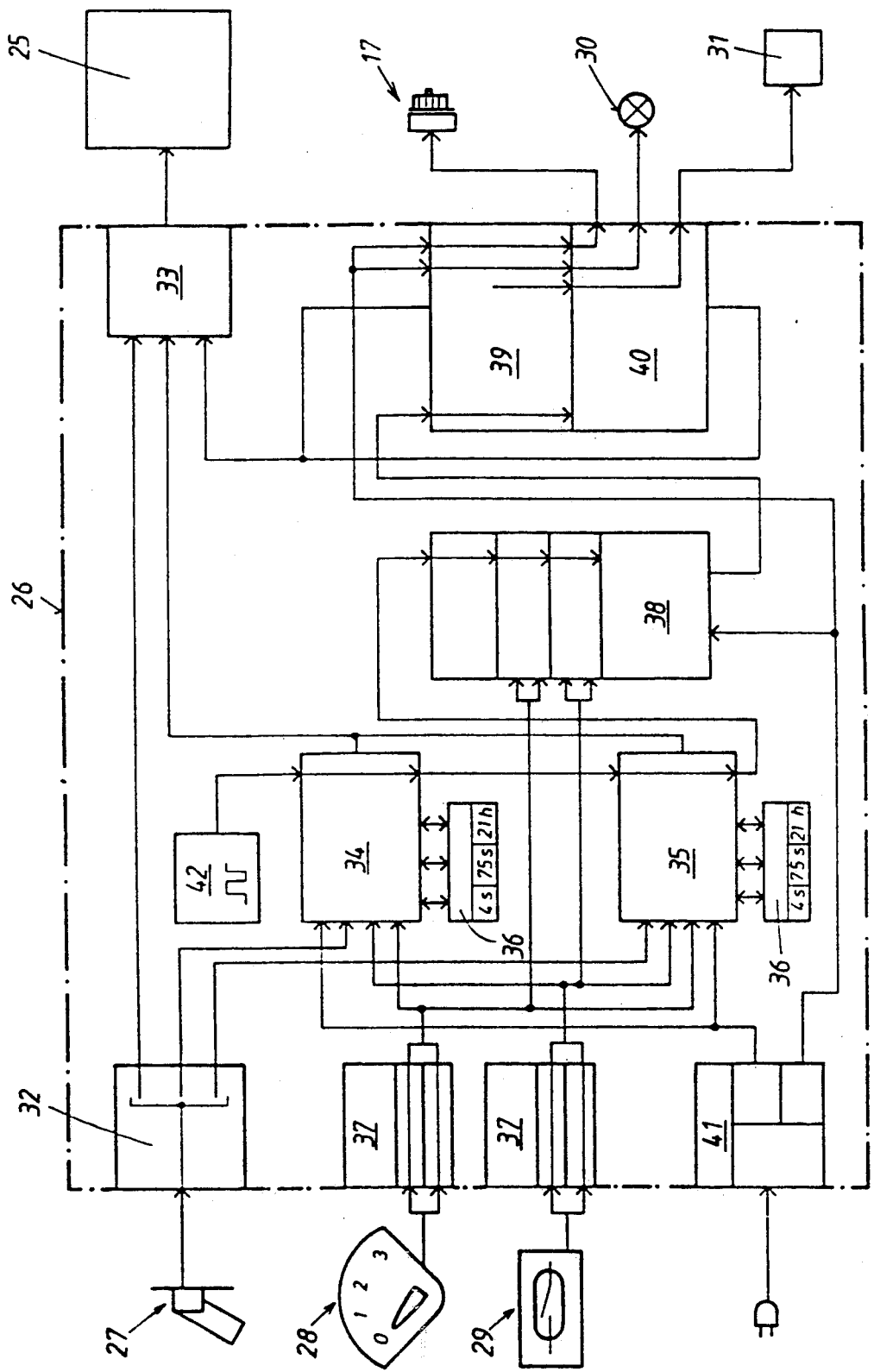
FIG. 4 is a block diagram of the door-safety module.

In addition to the just described main drive mechanism, illustrated in FIG. 2 and comprising a continuous belt drive 13, the door panels can also be operated with an auxiliary drive mechanism. This mechanism consists essentially of a resilient structure 21 with one end engaging one of the panels (11 for example) and the other end secured to a stationary point 22 on springer 12. When the panel is shifted into its closed position by motor 16, resilient structure 21, which travels around pulleys 23, is tensioned and accumulates potential energy when panels 10 and 11 are together. When, accordingly, the door is closed and electromagnetic clutch 17 is deprived of current, the tension in resilient structure 21 will force panels 10 and 11 into the open position illustrated in FIGS. 2 and 3. Obviously, since both panels are connected by belt drive 13, panel 10 will move along with the panel 11 that is directly subjected to resilient structure 21. The two panels can be secured together when closed by a known type of locking mechanism 24.

The motion of panels 10 and 11 is regulated with regular controls 25 electrically connected to a door-safety module 26 that constitutes additional electronic controls. Door-safety module 26 is positioned between a motion sensor 27 (which can e.g. be a radar, infrared, ultrasonic, or visible-light barrier), a programming switch 28, and a limit switch 29 on the one hand and the regular controls 25, the electromagnetic clutch 17, and signaling devices 30 and 31 on the other. The door-safety module comprises a coupling stage 32 that is directly connected to motion sensor 27 on the one hand and to a START processor 33 that is a component of the door-safety module on the other, with additional lines leading from coupling stage 32 to one logic channel 34 and to another parallel logic channel 35, both of which are also components of door-safety module 26. Each logic channel 34 and 35 has a variable timer 36 that in the illustrated embodiment can be set to 4 seconds, 75 seconds, and 21 hours. Logic channels 34 and 35 are also connected to START processor 33. Programming switch 28 is connected on the one hand to logic channels 34 and 35 by way of an input filter 37 that is part of door-safety module 26 and on the other to a multistage FAIL-SAVE comparator 38 that is itself connected to restricted relays 39 and 40. The relays are interconnected and have output terminals connected to electromagnetic clutch 17 on the one hand and to signaling devices 30 and 31 on the other. Limit switch 29 is also connected by way of an additional input filter 37 in door-safety module 26 to logic channels 34 and 35 on the one hand and to FAIL-SAVE comparator 38 on the other. Finally, door-safety module 26 also includes a generator 42 that forwards pulses to logic channels 34 and 35 and their timers 36 on the one hand and to FAIL-SAVE comparator 38 on the other.

Programming switch 28 and limit switch 29 are designed redundant as openers and closers. The signals that they forward to the door-safety module travel through the corrective input filter 37 in each logic channel 34 and 35 and to FAIL-SAVE comparator 38. This last component compares the instantaneous switching stage of the opener and closer, whereby switch equivalence is immediately available to detect errors in signaling devices 30 and 31, and the electromagnetic clutch is simultaneously deprived of current.

The inherently reliable motion sensor 27 forwards its signals to logic channels 34 and 35 and directly in the form of an output to START processor 33. START processor 33, however, can also be switched through logic channels 34 and 35.

All timing stages are subservient to pulse generator 42, which generates the system clock. The clock drives a direct current that secures restricted relays 39 and 40. Logic channels 34 and 35 make it possible to discontinue the timing and release the relays. The two relays' contacts are in series and open the circuit to electromagnetic clutch 17. Relays 39 and 40 also have additional contacts that activate the signaling devices, with signaling device 30 responsible for visible signals and signaling device 31 reporting malfunctions externally. START processor 33 allows logic channels 34 and 35 to emit signals for opening the door to regular controls 25. Each logic channel in the present embodiment accommodates a program in the form of GAL modules, which represent circuits with internal connections that can be established and disestablished. The channels can also include whatever timers 36 are needed.

To carry out its assignments the door-safety module 26 needs input information as to the position of the programming switch 28, a limit switch 29 that will represent the position of the door once the latter has opened to a certain extent, and motion sensor 27. The output terminals of the door-safety module constitute a connection for electromagnetic clutch 17 and connections for visual signaling device 30 and malfunction external-signaling device 31 and for forwarding the interior signals to the door's regular controls 25.

The door is ready to operate when external power is being supplied and when programming switch 28 is in the zero state (off). Electromagnetic clutch 17 is engaged. Programming switch 28 is tripped, activating the door. Logic channels 34 and 35 and their associated timer 36 activate door-safety module 26 for a brief waiting time (4 sec). The waiting time allows regular controls 25 to unbolt the door. Upon expiration of the waiting time the test of auxiliary drive mechanism previously described herein will be initiated. An incorrectly conducted test can be repeated by deactivating and reactivating the door with programming switch 28. Subsequent to a positive test with programming switch 28 remaining in the active state, the test of the auxiliary drive mechanism will be automatically repeated in cycles upon expiration of the time of stationary point 21 hours stored in timer 36.

Door-safety module 26 acts as additional controls for an automatic sliding door. The module's primary purposes are 1. to monitor the opening and closing of the door in response to a signal from the motion sensor,
2. to automatically test for verification that the auxiliary drive mechanism is working, and
3. to provide inherent ensurance of the reliability of monitoring procedure 1 and function test 2.

Figure 5:
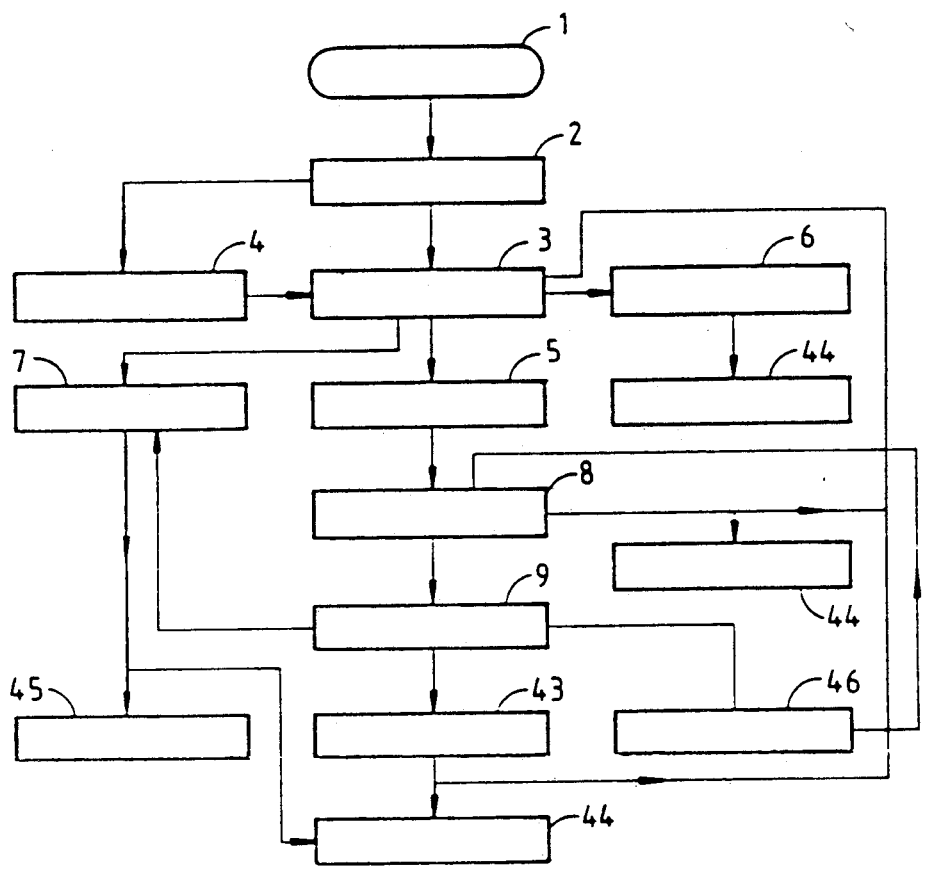
FIG. 5 is a chart illustrating the function of the door-safety module.

To carry out these assignments, the door-safety module requires, as previously described herein, the reliable inputs from the programming switch, limit switch, and motion sensor. The door-safety module, which is controlled by the program, itself forwards information again to the electromagnetic clutch and the signaling devices. The procedures represented by the chart in FIG. 5 will now be specified.

At block 1, no current is supplied to the drive mechanism and the clutch is disengaged. Current begins to be introduced at block 2 and the redundant programming switch can go into one of two states. If it begins operating automatically as represented by block 4, the clutch will engage automatically as represented by block 3. The programming switch can, however, also be in an overnight-operation state which triggers the same function on the part of the clutch. When the programming switch is operating automatically, the unbolting waiting time is activated as represented by block 5. In the subsequent function test at block 8 the auxiliary drive mechanism is activated. If the auxiliary drive mechanism is functioning normally, a signal is released by way of a connection to block 3 that the clutch is engaged again, and the automatic sliding door can be maintained in normal operation. If on the other hand a malfunction is detected, an error signal 44 will simultaneously be externally released. When the auxiliary drive mechanism is operating normally, long-term timer activation will also subsequently be attained at block 9. Long-term timer activation is necessary to reinitiate the automatic internal test of the auxiliary drive mechanism's function, which occurs in normal operation after a prescribed interval of time. If on the other hand the long-term test is incorrectly monitored, the situation will be reported at block 43 to malfunction-signaling program 44 and simultaneously back to block 3, where the clutch is engaged. When, due to some error, extended time 9 expires, timing stage 46 will be activated, releasing a signal to the auxiliary drive-mechanism block. This will then simultaneously initiate a functional test of the auxiliary drive mechanism, so that, even when the prescribed extended time is exceeded, it will be ensured that the auxiliary drive mechanism is tested and the door reliably opened. Another possible source of malfunction is that, once the extended time has expired, either the programming switch, the limit switch, or door-safety module 26 itself is defective. In this case a signal would be forwarded to block 7, which would again initiate manual unbolting 45 and simultaneously forward an error signal to block 44. This same error description would also be released when it is detected in block 3 that either programming switch 28, limit switch 29, or door-safety module 26 is defective. The aforesaid "blocks" can also be interpreted as steps in the overall program.

The door-safety module 26 that executes the aforesaid functions can either be discrete or in the form of a completely integrated module.

Figure 6:
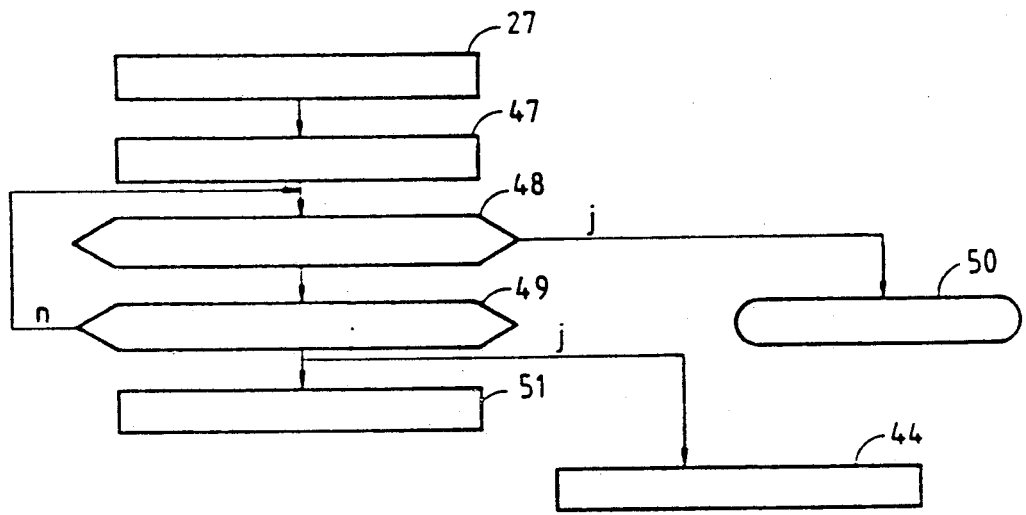
FIG. 6 is a flow chart illustrating how the main drive mechanism is monitored.

The sequence involved in monitoring the main drive mechanism is illustrated in FIG. 6 and will now be specified. Motion sensor 27 triggers long-term start 47. This procedure is necessary to open the door within a prescribed interval. If the limit switch is triggered during this interval, block 48 will communicate the fact to main drive mechanism 50. The mechanism is accordingly ready and the door can be operate reliably. If limit switch 29 is not triggered within the prescribed interval, block 51 will forward a command to the clutch, which must be disengaged. Another command, however, will simultaneously be forwarded to error signal 44, which will communicate the error outside. Once the time has expired, another signal will be sent back to the beginning, and another attempt can be made to exceed the position of limit switch 48.

Figure 7:
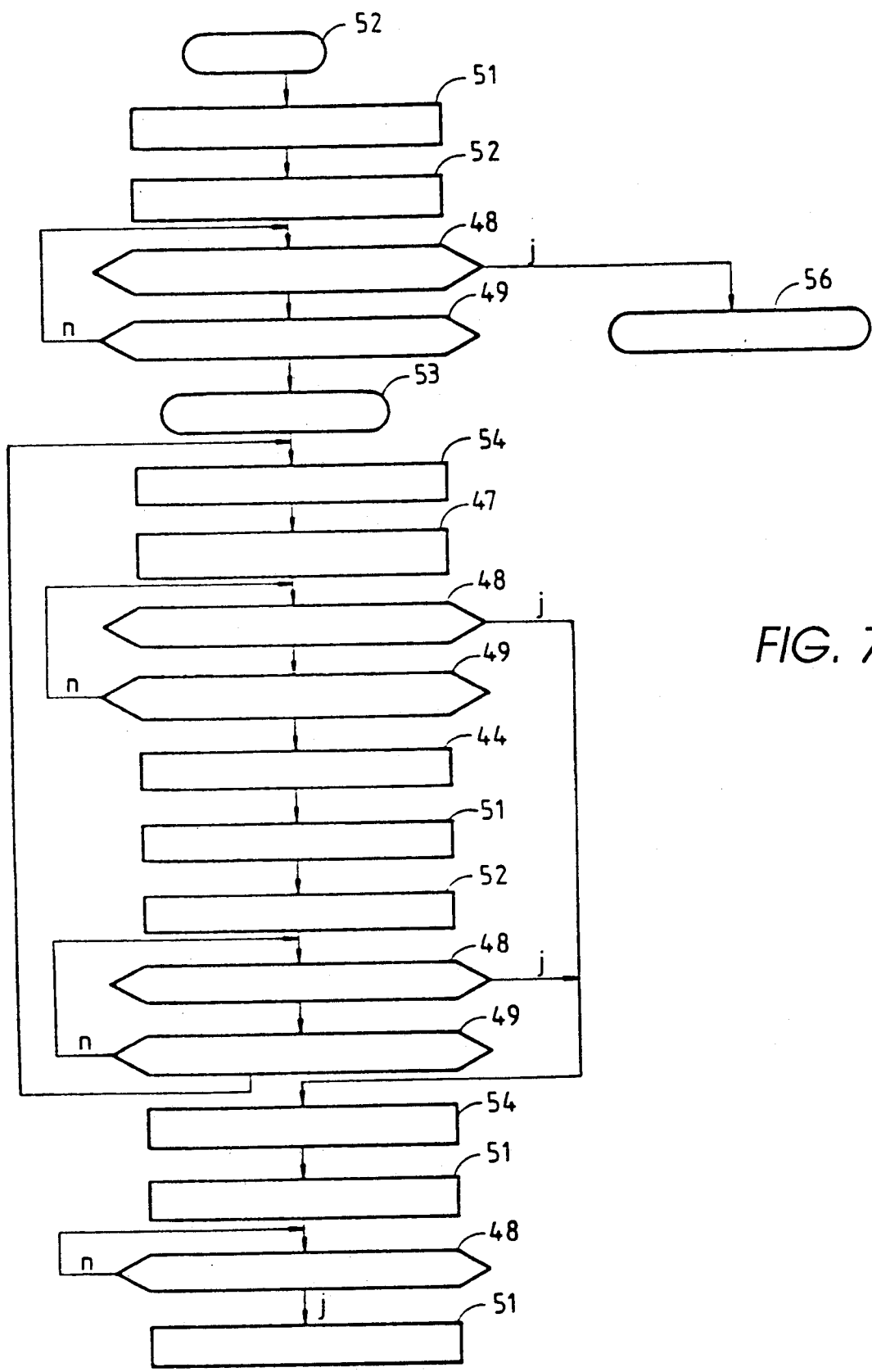
FIG. 7 is a flow chart illustrating how the function of the auxiliary drive mechanism is carried out.

FIG. 7 is a flow chart of the function test of the auxiliary drive mechanism. A START signal 52 separates the clutch with clutch command 51 from motor 16. Once electromagnetic clutch 17 has been separated, auxiliary drive mechanism will become active in a way that will release the energy in the storage device, and the door panel will execute the desired motion. This motion must be completed by a prescribed time 55 that is distinctly shorter than the extended interval addressed in block 47. If the limit switch is passed within prescribed interval 55 a signal 48 is forwarded to the limit switch that auxiliary drive mechanism 56 is completely functional. If limit switch 29 is not passed within prescribed brief interval 52, program block 48 will forward an associated command for time comparison 49 to the beginning of brief-interval START 51. This approach ensures that the complete opening or closing procedure can be repeated. If on the other hand, the test turns out defective, the error will be communicated by way of block 53. The programmed controls will now attempt to move the door by way of the main drive mechanism.

For this purpose a clutch signal 54 is emitted that connects electromagnetic clutch 17 to motor 16 again. Door-safety module 26 now attempts by way of timing START 47 to move the door throughout a longer interval. If it succeeds within the prescribed interval, limit-switch monitoring stage 48 will execute a command 54 to connect electromagnetic clutch 17 to motor 16. In this event the test proceeds normally and the door is completely open. If on the other hand limit switch 29 is not attained or exceeded within the prescribed extended interval 47, time-comparison stage 49 will send a signal back to reinitiate starting the extended time. An error signal will simultaneously be emitted outward at block 44 to indicate the presence of an error. The whole procedure is repeated. Clutch command 51 will then separate electromagnetic clutch 17 from motor 16 again and the auxiliary drive mechanism will attempt to move the door panel within brief interval 52. If the limit switch is passed, a command 48 will be forwarded to the clutch and normal operation will be resumed. If on the other hand limit switch 48 is not passed within prescribed interval 52, time-comparison stage 49 will forward another signal to the auxiliary drive mechanism to repeated the same sequence of motions once again. Simultaneously, when timing 49 cannot move the door component during the second attempt, a test is again conducted in this event to open the door with the major drive mechanism. As the chart indicates, alternating attempts are made to open the door by the auxiliary drive mechanism and the main drive mechanism. These attempts are continued until the door component moves appropriately and a signal indicates the successful opening or closing of the door. Since there is a malfunction in the system in such an event, it is necessary to restart the overall smooth operation of the sliding-door system, which must be done manually.

All tests must, as has already been specified, by conducted either with the auxiliary drive mechanism or with the main drive mechanism within a specified time. If the tests do not occur within this interval, it indicates difficulties or a malfunction. In this event the door will in any case be moved into a safe position that will not constitute a threat to the people using it. In the case of an escape and rescue doorway this means that the door will remain open while a malfunction signal is forwarded to the central point. These tests are also conducted continuously when the door is in constant use. The period within which the tests must be conducted can be prescribed in the program.

In the present system of controls every motion is monitored by the motion sensor until the door begins to move. Once the motion sensor detects a motion, it communicates the information, DOOR OPENING for example, to the door-safety module, which forwards it to the main drive-mechanism controls and waits for the door to open within the prescribed interval. If the main drive mechanism cannot open the door, door-safety module 26 will automatically shift over to the auxiliary drive mechanism while simultaneously emitting a malfunction signal. Should the door be obstructed by an obstacle (e.g. a shopping cart) while moving in one direction, resulting in a malfunction signal, the system must be returned to operation once the obstacle has been eliminated. For this purpose the programming switch must be activated and set for the desired mode of operation. The malfunction signal will terminate automatically and the door will immediately initiate automatic self-testing. In addition to the programming switch there can be an emergency switch that will open the door panel in an escape and rescue doorway for example with an emergency-opening module. Door-safety module 26 will in this event simultaneously emit a malfunction signal once it has shifted over to the auxiliary drive mechanism. The emergency OFF switch can also be unbolted to terminate the malfunction signal, in which case the door system will be completely ready to operate. In the event of a power failure the panels of the escape and rescue door will be immediately separated by the auxiliary drive mechanism as soon as the current is cut off. A malfunction signal will simultaneously be released again. Once the system has been manually activated with the programming switch 28, the auxiliary drive mechanism will be self-tested again in this case as well.

These measures ensure that the present design will in conjunction with the program ensure reliable operation of an escape and rescue door or ordinary automatic sliding door.

We claim:

1. Sliding door with at least one panel coupled with a belt-drive mechanism driven in turn by a motor by way of an electromagnetic clutch, whereby the panel is also connected to an auxiliary drive mechanism that is provided with energy by the panel as it slides into a closed position, that can move the panel when the clutch is deprived of current, with at least one programming switch, motion sensor, and limit switch for activating regular controls that move the panel automatically, and with additional electronic controls, characterized by a door-safety module (26) that is controlled in accordance with a program and has at least one motion sensor (27) and one limit switch (29) associated with it.

2. Sliding door as in claim 1, characterized in that the door-safety module (26) is interposed between a motion sensor (27), the programming switch (28), and a limit switch (29) on the one hand and the regular controls (25), the electromagnetic clutch (27), and signaling devices (30 & 31) on the other.

3. Sliding door as in claim 1, characterized in that the door-safety module (26) has a coupling stage (32) that is connected to the motion sensor (27) and to a START processor (33), directly and by way of two logic channels (34 & 35), each equipped with a timer (36), in that both the programming switch (28) and the limit switch (29) are electrically connected to the START processor by way of the logic channels and to the electromagnetic clutch (17) and signaling devices (30 & 31) by way of a multistage FAIL-SAVE comparator (38) and downstream relays (39 & 40), and in that the logic channels and FAIL-SAVE comparator are connected to a generator (42) that times the whole system.

4. Sliding door as in claim 1, characterized in that the door-safety module (26) has input filters (37), one downstream of the programming switch (28) and upstream of the logic channels (34 & 35) and the other between the limit switch (29) and logic channels and the FAIL-SAVE comparator (38).

5. Sliding door as in claim 1, characterized in that the door-safety module (26) is individually supplied with current.

6. Sliding door as in claim 1, characterized in that the door-safety module (26) has discrete components.

7. Sliding door as in claim 1, characterized in that the door-safety module (26) is an integrated circuit.

8. Sliding door as in claim 1, characterized in that the programming for the door-safety module (26) includes monitoring the main drive mechanism.

9. Sliding door as in claim 1, characterized in that the motion sensor (27) triggers a timing-START command (47), within which time the particular limit switch (29) must be passed.

10. Sliding door as in claim 1, characterized in that the electromagnetic clutch (17) separates the main drive mechanism from the motor (16) once the time prescription (47) has expired.

11. Sliding door as in claim 1, characterized in that the program tests the function of the auxiliary drive mechanism by way of the door-safety module (26).

12. Sliding door as in claim 1, characterized by, in the event of a malfunction signal on the part of the auxiliary drive mechanism, an immediate shift to the main drive mechanism, whereby the operating unit undertakes a movement of the door panel, whereby this procedure is repeated until the panel is either opened in accordance with the program or reliably closed.

13. Sliding door as in claim 1, characterized in that, once a malfunction has occurred and the system has been restarted, the door-safety module executes self-testing of the overall door system.

14. Sliding door as in claim 1, characterized by audible and visible communication of a malfunction.

* * * * *